United States Patent
Hughes et al.

(10) Patent No.: US 8,316,136 B2
(45) Date of Patent: *Nov. 20, 2012

(54) MULTI-PROTOCOL NETWORK REGISTRATION AND ADDRESS RESOLUTION

(75) Inventors: Sterling Hughes, San Mateo, CA (US); Jana van Greunen, Redwood City, CA (US); William L. Pugh, San Jose, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 741 days.

This patent is subject to a terminal disclaimer.

(21) Appl. No.: 12/471,107

(22) Filed: May 22, 2009

(65) Prior Publication Data

US 2010/0299441 A1 Nov. 25, 2010

(51) Int. Cl.
*G06F 15/16* (2006.01)
(52) U.S. Cl. ......... 709/227; 709/228; 709/242; 709/246
(58) Field of Classification Search .................. 709/228, 709/242, 246, 227
See application file for complete search history.

(56) References Cited

U.S. PATENT DOCUMENTS

| | | | |
|---|---|---|---|
| 6,088,659 A * | 7/2000 | Kelley et al. ................... 702/62 |
| 6,933,857 B2 * | 8/2005 | Foote ....................... 340/870.02 |
| 2006/0091877 A1 * | 5/2006 | Robinson et al. .......... 324/76.11 |
| 2006/0129665 A1 * | 6/2006 | Toebes et al. ................. 709/223 |
| 2007/0130408 A1 * | 6/2007 | Leach ........................... 710/305 |
| 2008/0095221 A1 * | 4/2008 | Picard ........................... 375/224 |
| 2008/0189415 A1 * | 8/2008 | Vaswani et al. ............... 709/226 |
| 2008/0189436 A1 * | 8/2008 | Vaswani et al. ............... 709/242 |
| 2008/0224889 A1 * | 9/2008 | Wyk et al. ................ 340/870.01 |
| 2009/0034419 A1 * | 2/2009 | Flammer et al. .............. 370/238 |

* cited by examiner

*Primary Examiner* — Krisna Lim
(74) *Attorney, Agent, or Firm* — Buchanan Ingersoll & Rooney PC

(57) ABSTRACT

The functionality of communications standards and protocols that are application-layer specific are overlaid on an IP-based infrastructure, by employing an IP DNS server as the registration host for IP and other communications standards based and protocol based communications. Communication can occur at either the IP layer or the communications standards or protocol application layer. At the IP layer, a host application can interrogate network nodes. To extend this service to other communications standards or protocol communications, device registration and resolve services are implemented on the DNS server. Similar to the manner in which an IP-based service uses a native, IP-based DNS resolve request, a host can utilize a resolution request against the communications standards and protocol-enabled DNS server for standards and protocol application-layer interrogation of endpoints.

17 Claims, 6 Drawing Sheets

MULTI-PROTOCOL NETWORK REGISTRATION AND ADDRESS RESOLUTION

BACKGROUND OF THE INVENTION

The present invention relates to utility networks and, more particularly, to a system and method of operating a utility network management system for network-based registration of devices associated with the delivery of commodities provided by utilities, and address resolution for such devices.

The American National Standards Institute (ANSI) has developed a series of standards and associated protocols to enable data generated by utility meters, e.g. electric meters, to be electronically communicated. Similarly, protocols have been developed for communication with Distribution Automation (DA) devices employed in the delivery of utility services. The invention disclosed herein deals with addressing, address resolution, and the infrastructure required to provide comprehensive network services that are supported by these standards.

For example, ANSI C12.19 defines the formats for meter data and structure of tables containing such data. Earlier versions of the ANSI metering protocols provided for media-dependent mechanisms to interface with meters that conform to the ANSI C12.19 standard. Two of these earlier versions are germane to an understanding of the context of the present invention:
- ANSI C12.18 (or PSEM) was designed to interface meters over a serial port. It allowed for a primitive set of protocol operators (or "verbs") that allowed programmatic interrogation (i.e., "reads") and programming (i.e., "writes") to meters. This interface was initially designed for handheld devices, but came to be used by a non-standardized set of communication modules for networking meters.
- ANSI C12.21 extended C12.18 to provide an interface to meters via modems that communicate over telephone systems.

A more recent standard, C12.22, came about as a way for the utility meter industry to abstract away the complexities of several disparate networking technologies. For instance, many cellular technologies such as GPRS and CDMA 1XRTT were becoming widely available, as were a few fixed networking technologies of limited scale. The C12.22 protocol was under development well before the notion of large scale, fixed networks for residential metering was commonly shared.

Regardless of any agnosticism or support at the Physical layer (L1) of the OSI network model, the C12.22 standard does maintain agnosticism at Data Link (L2) and Network (L3) layers. In order to do so, C12.22 provides, at the Application layer (L7), a scheme for addressing, address resolution, maintaining state, fragmentation/re-assembly, and application layer routing, and other features. For any of these services and applications to be useful, one must resolve lower layer networking addresses in order to forward frames using C12.22 to C12.19-compliant devices. In a flat, "point-to-point" cellular network (e.g., GPRS or CDMA1XRTT), this may be a simple process: bind an IP address to a C12.22 application layer address (i.e., a C12.22 apTitle) in a registry. And in smaller networks with built-in hierarchy (or constraints), this process is straightforward.

However, C12.22 was not designed with a view towards large-scale networked commodity metering deployments (for example AMR/AMI and in-premise networks); nor was it designed for environments where the underlying network infrastructure addresses are highly dynamic.

In the area of Distribution Automation, protocols for communication with Distribution Automation (DA) devices have been developed and employed in the delivery of utility services.

For example, the MODBUS® protocol defines a message structure that controllers recognize and use, regardless of the networks in which they communicate. MODBUS describes the process a controller, such as a Supervisory Control and Data Acquisition (SCADA) system, uses to request access to another device, such as a DA device. Moreover, MODBUS describes how the SCADA system will respond to requests from the DA device and how errors are detected.

The MODBUS protocol is used to establish master-slave communications between the SCADA system and the DA device. MODBUS has two types of serial transmission modes, ASCII and RTU. In ASCII serial transmission mode, each 8-bit byte in a message is sent as two ASCII parameters, whereas, in RTU serial transmission mode, each 8-bit byte in a message is sent as two 4-bit hexadecimal characters.

In another example, DNP 3.0 is a protocol used by a SCADA system to communicate data and control commands to a DA device. DNP 3.0 and MODBUS protocols normally operate over serial lines, but have recently been modified to also operate over TCP/IP. In the DNP 3.0 protocol, each device has a two-byte address. In the MODBUS protocol, each device has a single byte address. Both of these addresses may be associated with an IP addresses when TCP/IP is used. Typically the SCADA system communicates with small groups of these devices. The SCADA system decides which DNP 3.0 or MODBUS address it is going to send the command to, and then it looks up the IP address in a static table. However, in the case of a wide-scale network architecture where all nodes communicate with a common back-office host, the 1 or two byte addresses may not be sufficient to distinguish all the devices in a utilities' territory. Further, the DA communication node that is attached to the DA device may change its IP address when it joins different IP networks.

SUMMARY OF THE INVENTION

The invention disclosed herein addresses the foregoing limitations of the standards and protocols that are application-layer specific, by providing easier to implement systems that utilize well-known, IP-based application protocols such as Domain Name Servers (DNS) or directory server technology, such as LDAP. The invention prescribes DNS-based registration support and address resolution services for devices that communicate at the application layer.

BRIEF DESCRIPTION OF THE DRAWINGS

The foregoing aspects and many of the attendant advantages of the invention will be more readily appreciated and better understood by reference to the following detailed description, when taken in conjunction with the accompanying drawings, wherein.

DETAILED DESCRIPTION

To facilitate an understanding of the concepts embodied in the present invention, exemplary embodiments will first be described with reference to its implementation in connection with devices that support the C12.22 standard, followed by a description of other implementations.

The architectural concepts and components related to addressing and address resolution relevant to the C12.22 standard are defined hereinafter:

C12.22 Device: a module that hosts C12.22 application(s) and provides at least one interface to a C12.22 communications module.

C12.22 Communications Module: the network interface that provides two-way communications between the C12.22 device and a central utility server.

C12.22 apTitle: an application layer address based on ASN.1 numbering. Every C12.22 communications module (or node) has a C12.22 address. The address can be absolute or relative.

C12.22 Relay: a component that can resolve network layer (either L2 or L3) addresses to application layer addresses across one directly connected medium (e.g., Ethernet LAN; RF subnetwork). The Relay also implements both the registration and resolve services.

C12.22 Master Relay: a component that can resolve network layer (either L2 or L3) addresses to application layer addresses across all deployed media (e.g., all subnets; all networks such as cellular and fixed RF wireless; etc.). The Master Relay can resolve network addresses that the C12.22 Relays cannot. The C12.22 Master Relay implements both the registration and resolve services. All C12.22 nodes require registration and address resolution support.

In a large-scale (e.g., residential) deployment of Advanced Metering Infrastructure (AMI) using an IP-based network, particularly a network where the IP address of an endpoint, e.g., a meter, is subject to change (e.g., a device associates and disassociates with multiple gateways), a registration function is required so that back office applications at a central location, e.g. the utility company, can interrogate the endpoint. In IP-based networks, one means of accomplishing this is to utilize Domain Name Service (DNS). In one embodiment of the invention, a network interface node in a utility wireless network may be multi-homed to multiple gateways and, by definition, may have multiple IP addresses. In such an embodiment, a dynamic DNS update (also referred to as DDNS) is used to fulfill this function.

Figure 1:
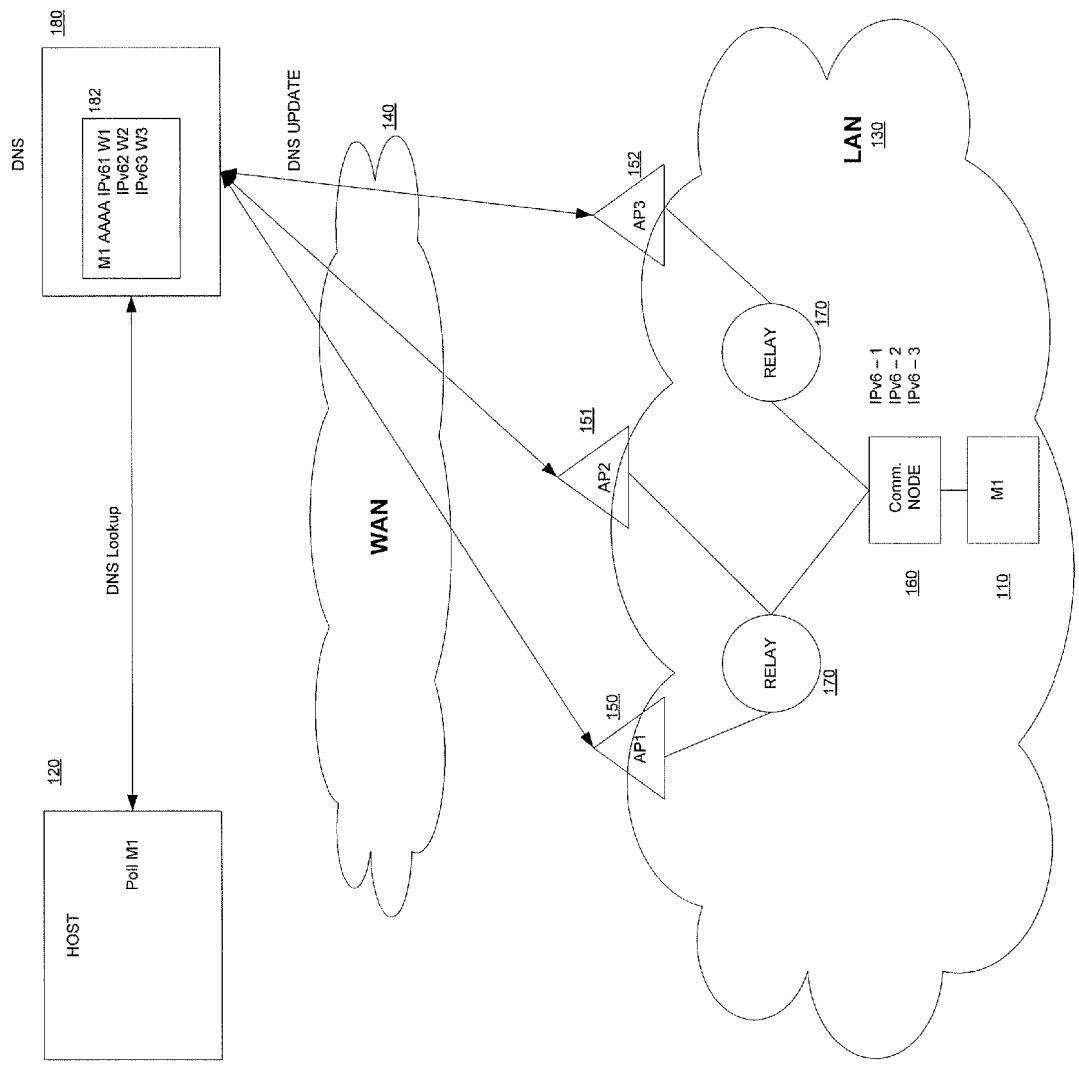
FIG. 1 is a block diagram of an IP utility network.

Referring to FIG. 1, an example of a conventional IP-based utility network is illustrated. For ease of understanding the principles that underlie the invention, only a single endpoint device is illustrated and discussed in the following examples. It will be appreciated, however, that in a practical implementation of the disclosed concepts, a multitude of such devices, e.g. thousands or tens of thousands per access point, might be present in any given network.

An endpoint device 110 of the network might be associated with a utility meter M1. Alternatively, the endpoint device 110 may be associated with a DA device. The network endpoints communicate with a host device 120, e.g. a back office server at a utility company, by means of a local area network 130, which constitutes a subnetwork, and a wide-area network 140. The local area network could be a wireless network or a power line carrier (PLC) network, for example. The wide-area network can be a proprietary network or a shared network, such as the Internet.

The interface between the local area network 130 and the wide-area network 140 is provided by one or more access points 150, 151, 152, e.g. gateways. Within the local area network, the endpoint 110 communicates with one or more of the access points by means of a communications node 160. The communications node includes an RF transceiver for transmitting and receiving wireless signals transmitted via the local area network, and has an address associated with the network layer (L2 or L3) of the OSI reference model, e.g. an IP address, assigned to it. In the illustrated example, the communications node is capable of multi-homing, i.e. it is able to communicate with the host 120 via three different access points 150, 151 and 152. To support this capability, the communications node 160 has three different IP addresses assigned to it, which are respectively associated with the three access points. In other words, each time the communications node registers with an access point, a new IP address is assigned to it. Each assigned IP address corresponds to a logical subnetwork associated with the corresponding access point.

Depending upon the distance between the communications node 160 and an access point, as well as other factors affecting signal path and strength, the node may be able to communicate directly with an access point. In the illustrated example, the node 160 communicates indirectly with each of the access points 150, 151 and 152, by means of relays 170. These relays may be dedicated devices that function only to transfer data packets from one node to another, or they may be other communication nodes that are associated with respective endpoint devices.

In the operation of such an IP-based utility network, the host 120 interrogates a communications node 160 (and, by proxy, the endpoint device 110 to which the communications node is connected) by means of its IP address. The host may receive a command to poll a meter M1 that is associated with the communications node 160. Upon receiving this command, the host sends a lookup request containing the name of the desired device to a name/address resolution server 180. In one embodiment, the server 180 can be a Domain Name Service (DNS) server. In another embodiment, the server 180 can provide a directory service, e.g. LDAP. In the discussion that follows, reference will be made to an embodiment that employs a DNS server. It will be appreciated, however, that a directory server can also be employed in the described embodiments as the name/address resolution server.

The DNS server contains a record 182 that identifies the IP address assigned to the named device. In the illustrated example, the node 160 has three IP addresses assigned to it, IPv61, IPv62 and IPv63, which are respectively affiliated with the three access points 150, 151 and 152. While these addresses are represented as IP version 6 addresses, it will be appreciated that other versions of the Internet Protocol can be used, depending upon the architecture of the network. When multiple addresses are assigned to a device, a preference metric can be employed to assist in the selection of the particular address to be returned in response to the request. For instance, each address can have an associated weight value W1, W2 or W3. This weight value can be assigned by the node when it registers with an access point, to indicate the quality of the communications link between the node and the respective access points, based upon any of a variety of criteria. Other factors that can be used for the preference metric can be routing preferences, sub-network configuration, and/or service group. The addresses can be stored as an ordered list, according to the value of the metric.

In response to the DNS lookup request, the DNS server retrieves the record 182 for the node identified in the request, and returns one of the IP addresses to the host 120. Typically, the DNS server will return the IP address with the highest weight value, e.g. the first address in the list. However, for load balancing purposes, if the access point associated with that address is handling a large amount of network traffic, the DNS server may select the IP address associated with another access point that has more capacity to handle traffic.

Upon receiving the IP address from the DNS server 180, the host 120 creates a data packet containing the polling command that is destined for the communications node 160, and routes it to the node via the particular access point associated with the IP address provided by the DNS server 180. Upon receiving this packet, the node 160 retrieves the data contained therein, in this case the polling command, and forwards it to the associated meter. In return, the meter provides the data requested by the polling command, e.g. the current meter reading, which is sent in a response packet to the host, via the same access point.

Figure 2:
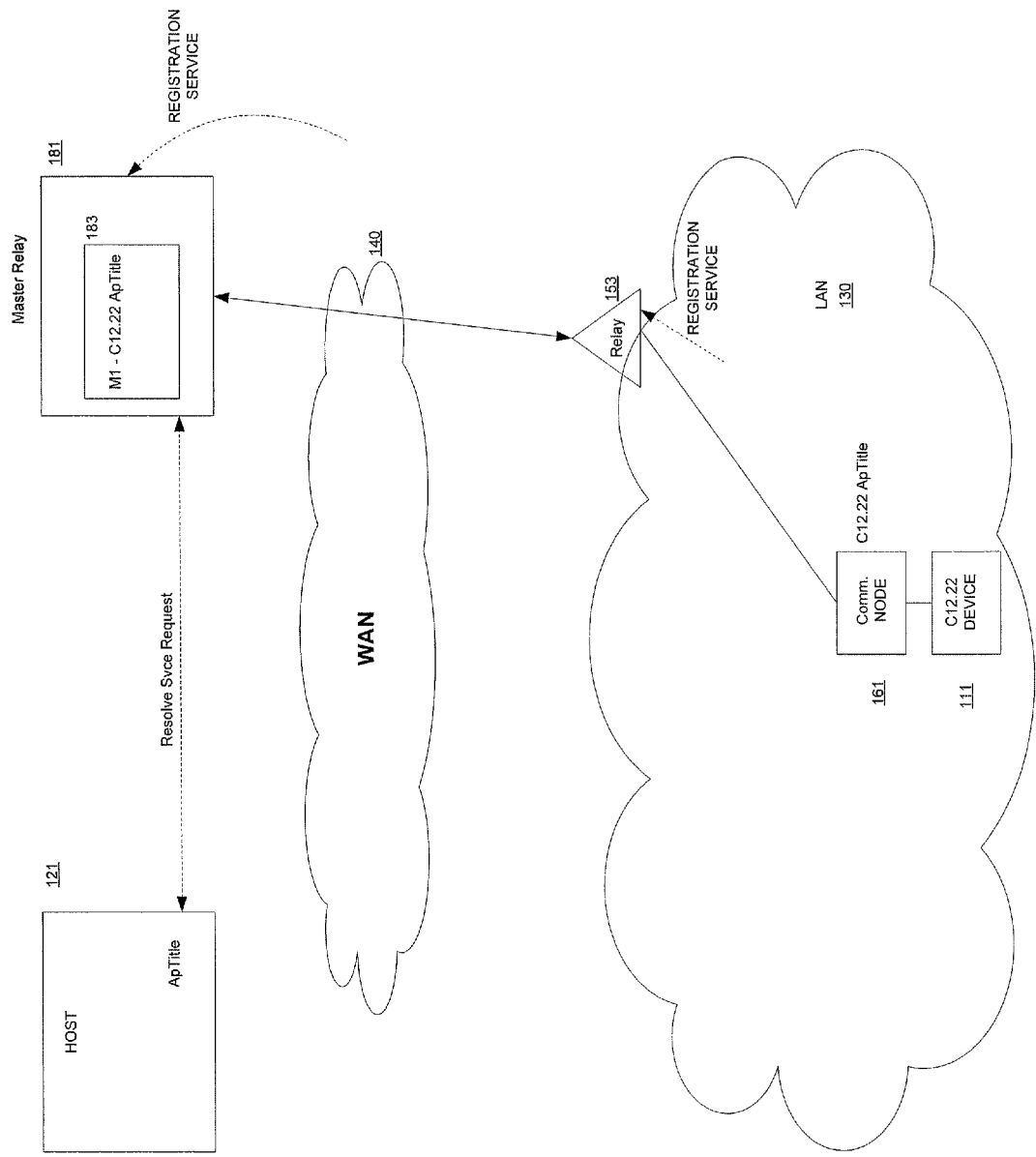
FIG. 2 is a block diagram of a network that operates according to the C12.22 standard.

FIG. 2 illustrates a conventional C12.22 network. When a C12.22 device 111, e.g., a meter, boots up on the network, it registers with a C12.22 Master Relay 181, via its associated communications node 161. The registration can be direct, or via an intermediate C12.22 Relay 153. Unlike the IP network described above, a C12.22 device is not conventionally capable of multi-homing, and therefore registers itself with only one Relay, or directly with the Master Relay. The C12.22 device registers its application layer address, namely its ApTitle, with the Relay or Master Relay. If a Relay is acting as a proxy for the C12.22 device, it registers the C12.22 device's ApTitle with the Master Relay.

A host 121 in a C12.22 network might be a Notification and Authentication host, which interrogates devices natively via the C12.22 standard. When the host desires to interrogate a meter, it sends a resolve service request to the Master Relay 181, which retrieves the appropriate record 183 and returns the ApTitle associated with the designated meter. The host then interrogates the meter via the Relay with which the device is registered, or directly via the Master Relay.

In the IP-based network, the communications between the host and the meter, or its communications node, takes place at the network layer (L3). In contrast, for the C12.22 network, the communications between the host and the C12.22 device occur at the application layer (L7) of the network. Unlike a network layer address supplied by the DNS server, the application layer address does not indicate how to connect to the device. It only provides the network name for the device. The operation of a C12.22 network is based on the assumption that there is a one-to-one mapping of an application layer address to a network layer address.

In accordance with the present invention, the functionality of a C12.22 application layer is overlaid on an IP-based infrastructure, by employing the IP DNS server as the registration host for both IP and C12.22-based communications. Communication can occur at either the IP layer or the C12.22 application layer. At the IP layer, the host application can interrogate the network nodes (and, by proxy, a meter connected to a network node). To extend this service to C12.22 communications, C12.22 registration and resolve services are implemented on the DNS server. Similar to the manner in which an IP-based service uses a native, IP-based DNS resolve request, a C12.22 host can utilize a C12.22 resolution request against the C12.22-enabled DNS server for C12.22 application-layer interrogation of endpoints (e.g., meters or in-home appliances that conform to the C12.22 standard).

Figure 3:
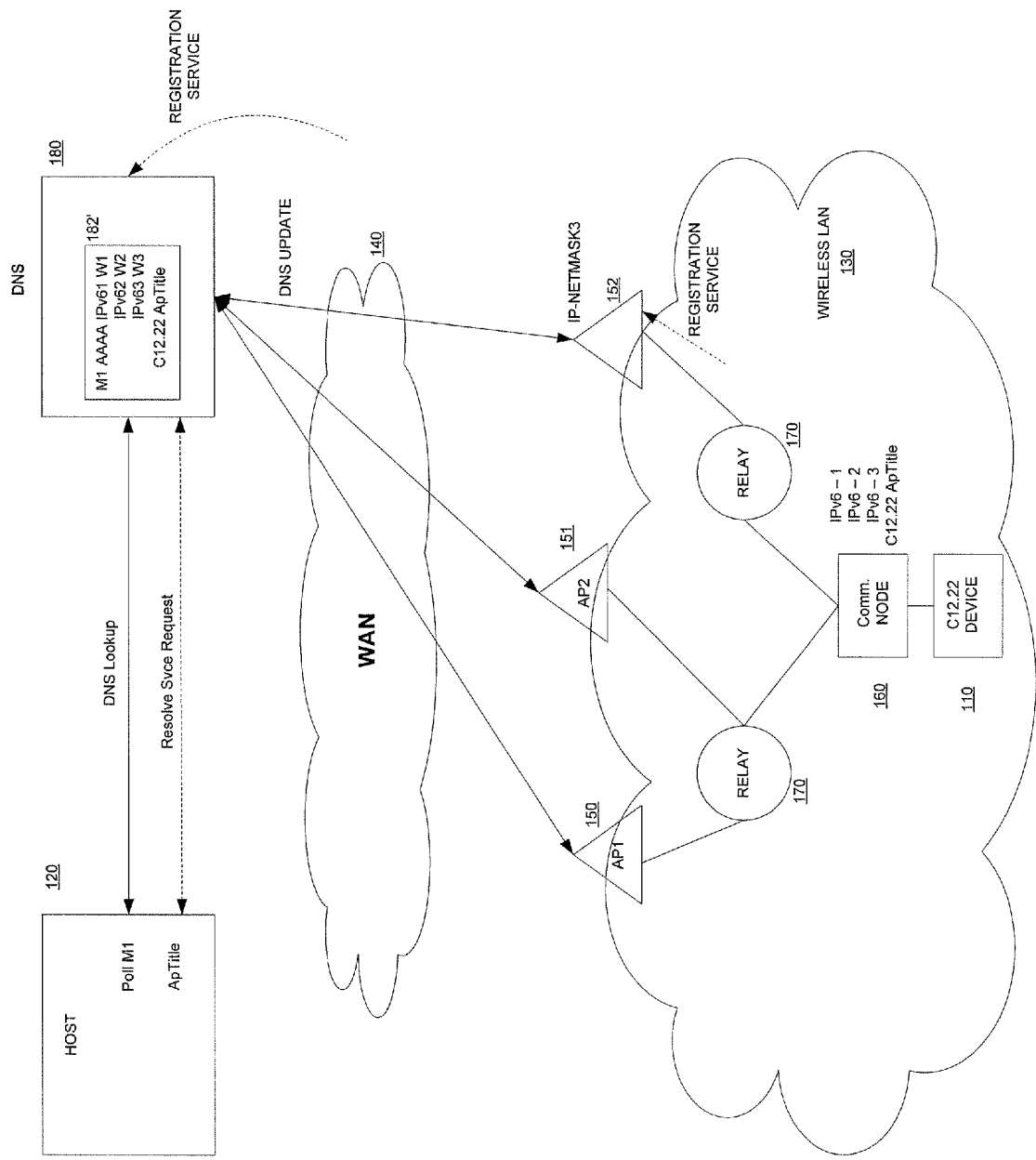
FIG. 3 is a block diagram of an IP network that contains a C12.22 device.

An example of a network configured to operate in this manner is illustrated in FIG. 3. A specific C12.22 DNS resource record 182' is defined that includes not only the IP address or addresses for the communications node associated with a given meter or other C12.22 device, but also the ApTitle assigned to the device. As a result, when a request is made to the DNS server, the server can return an address binding that is natively dependent on the type of request (i.e., a DNS request returns bindings in IP DNS format; a C12.22 resolution request returns bindings in C12.22 format). When presented with a fully qualified domain name, dynamic DNS provides the IP address currently associated with the named device, i.e. one of the three IPv6 addresses in the example of FIG. 3.

Furthermore, since the resource record contains both IP addresses and a C12.22 ApTitle, it can return both types of addresses in response to a single request. For example, in response to a DNS request, the server 180 can determine the ApTitle for the identified device, even though it was not requested, and return it along with the appropriate IP address.

With this approach, the DNS server fulfills the role of the C12.22 Master Relay, performing registration and de-registration (C12.22 services) at the C12.22 application layer. Devices can register (and de-register) at both the network and application layers. Conversely, either the network or application layer can overload the registration services at either one of the layers to eliminate redundant registration and de-registration packets. For instance, after registering its network address, the communications node 160 might intercept a C12.22 registration request from the device 110 and discard it, since it is superfluous to the previously registered network address.

In its native mode, the C12.22 device communicates with the host at the application layer (L7) of the network. As a further feature of the invention, communications with the C12.22 device can be carried out at the network layer, using IP-based protocols, while the device continues to operate in its native mode. In this aspect of the invention, when the host 120 sends a C12.22 resolve service request to the DNS server 180, the server does not return the ApTitle for the device indicated in the request. Rather, because the DNS resource record for the device contains both IP addresses and an ApTitle for the device, it is able to return an IP address. Using this IP address, the host is then able to send a command to the communications node 160 associated with the device.

Figure 4:
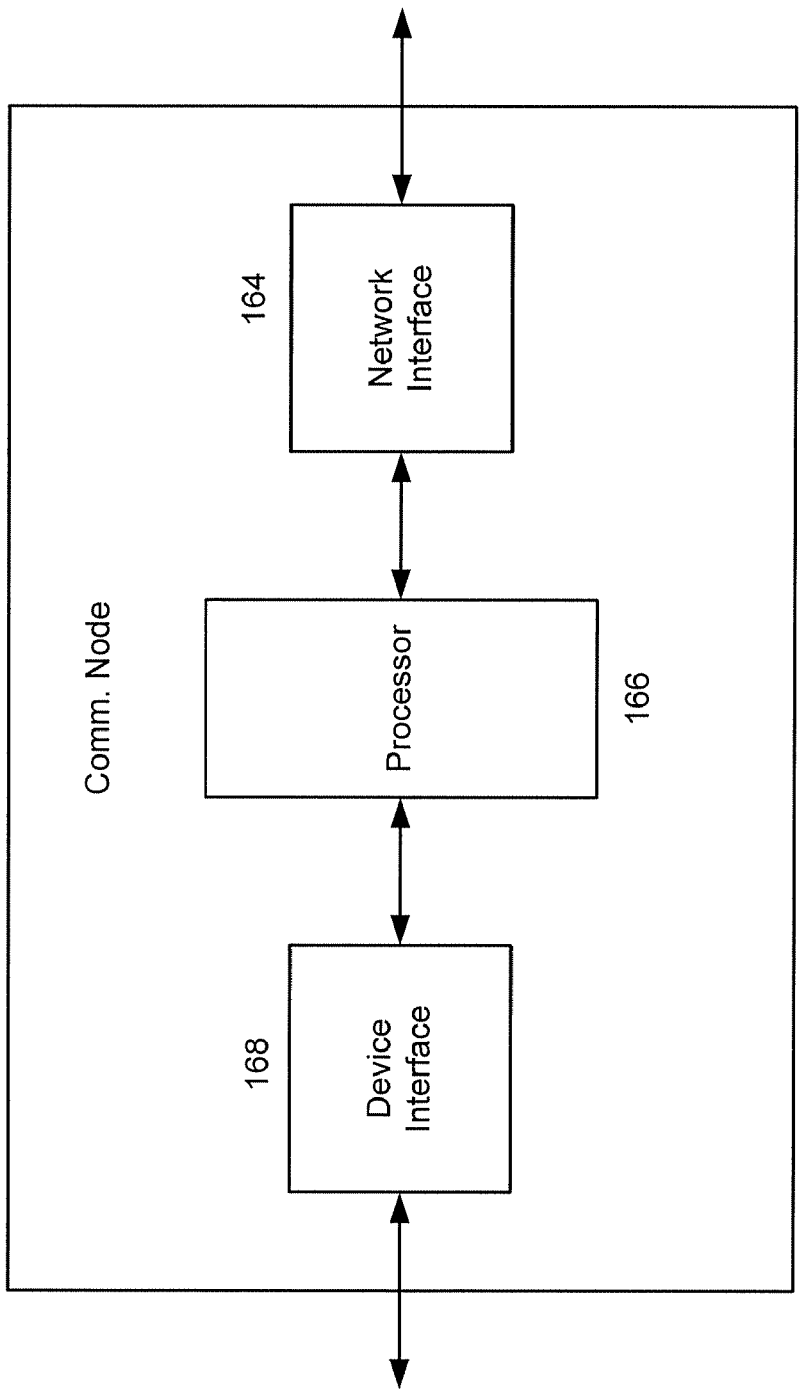
FIG. 4 is a block diagram of a communications node.

Referring to FIG. 4, the IP-formatted data packet sent over the network is received by the communications node 160 at a network interface 164. In the case of a wireless network, for instance, the interface 164 can be a component of a wireless transceiver. The interface 164 passes the received data packet on to a processor 166, which reads the data and reformats the command according to the C12.22 protocol. The C12.22-formatted command is then passed along to the intended device by means of a device interface 168. In the case of the presently described example, the device interface 168 supports the C12.22 protocol. In reply to the command, the communication node receives a response from the device, which conforms to the C12.22 standard, at the interface 168. Rather than sending this response at the application layer in the conventional manner, the processor 166 reformats the data into an IP packet, which is then transmitted over the network via the interface 164. As a result, the operation of the network is transparent to the C12.22 device. The only communications that employ the C12.22 protocol are those between the meter, or other C12.22 device, and the communications node. All other communications over the network are based upon the IP protocol.

A particular advantage of this aspect of the invention is that multi-homing becomes possible for C12.22 devices. Specifically, since IP-based protocols are employed to transmit the data from the C12.22 device over the network, rather than C12.22 protocols, all of the features and functionality of an IP network can be utilized. As a result, the communications node 160 can select any one of the available access points 150, 151 or 152 as the return path to the host, rather than being limited to the single Relay with which the C12.22 device is registered. A failure of the link to that Relay will therefore not prevent the data from reaching the host, due to the path diversity provided by multi-homing. Consequently, the robustness of the overall C12.22 system is increased.

Other endpoints (not shown) on the network may, or may not, also be C12.22 devices. Thus, the network can be homogeneous, consisting entirely of C12.22-compliant endpoint devices, or it can be heterogeneous, with a mixture of IP-based and C12.22-based endpoint devices. For example, the endpoint device may be a DA device.

In an alternative embodiment, a utility network management system for network-based registration of DA devices and address resolution may be implemented. As noted previously, two standard communication protocols developed for DA are DNP 3.0 and MODBUS. Additionally, it will be appreciated by those having ordinary skill in the art that the present invention is applicable to other DA protocols.

The architectural concepts and components related to addressing and address resolution relevant to DA communications protocols are defined hereinafter:

DA Device: a module that hosts client software that supports at least one DA communications protocol, such as MODBUS or DNP 3.0, and provides at least a serial or Ethernet interface to a DA communications node.

Communications Node: the network interface that provides two-way communications between the DA device and a central utility SCADA system.

Figure 5:
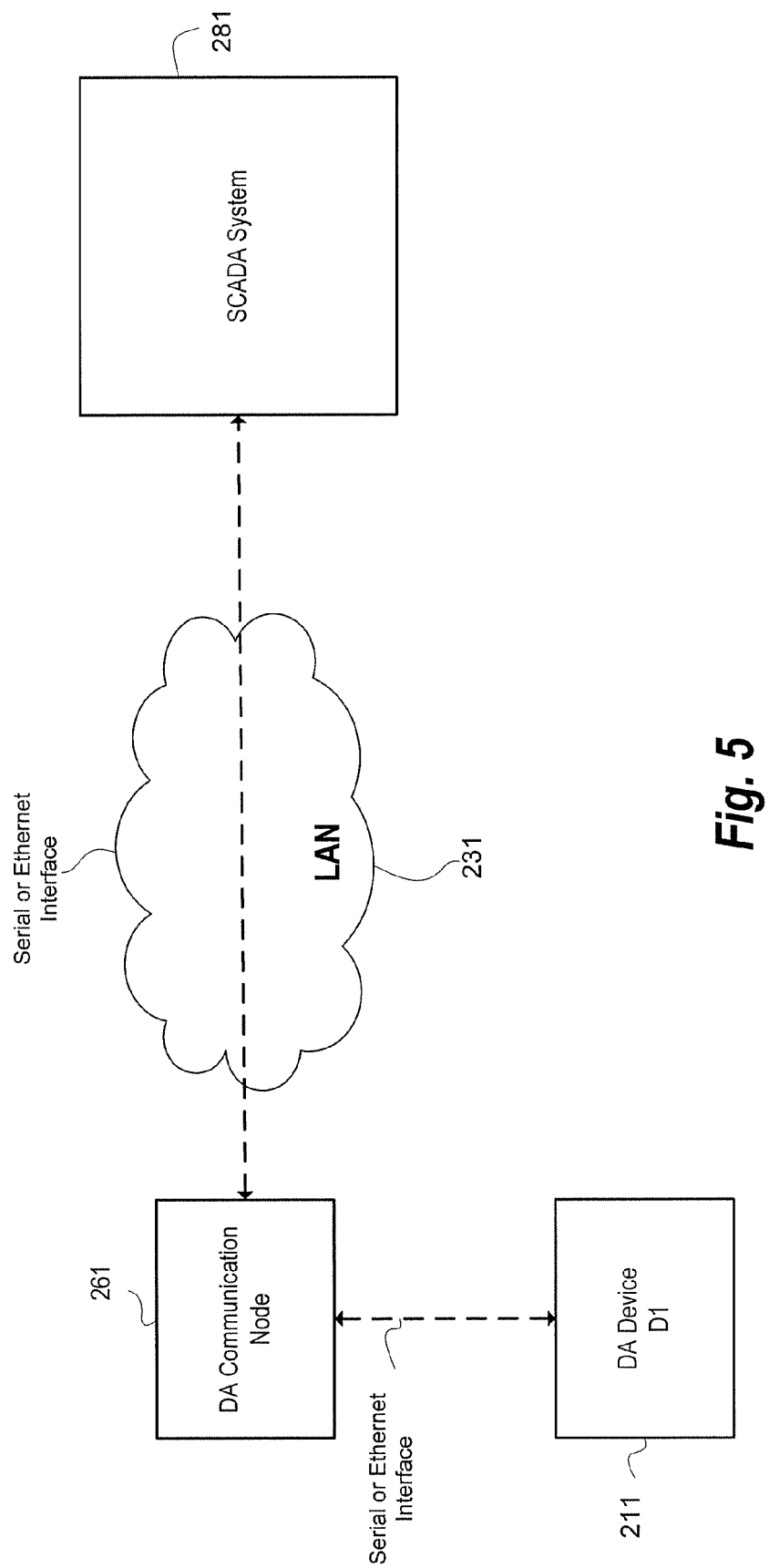
FIG. 5 is a block diagram of a network that operates according to a DA communications protocol standard.

FIG. 5 illustrates a conventional Supervisory Control and Data Acquisition "SCADA" system network for managing a DA device 211. Examples of DA devices include a generator, circuit breaker, tap changer, Substation Automation (SA), Feeder Automation (FA), Load Control Devices (LCD), Load Point Units (LPU), Intelligent Electronic Devices (IED), Programmable Logic Controllers (PLC), Distributed Control Systems (DCS), and Distribution Terminal Units (DTU).

When a DA device boots up on the network, it registers with a SCADA system 281, via its associated DA communications node 261. A DA device has a static address that is hard coded into the device. The DA device registers its application layer address, namely its static DA device address, with the SCADA system.

In the SCADA system network, the communications between the SCADA system and the DA device occur at the application layer (L7) of the network. Unlike a network layer address, the application layer address does not indicate how to connect to the device. It only provides the network name for the device. The operation of a SCADA system network is based on the assumption that there is a one-to-one mapping of an application layer address to a network layer address.

In accordance with the present invention, the functionality of a DA application layer is overlaid on an IP-based infrastructure, such as the communications network depicted in FIG. 1, by employing an IP DNS server as the registration host for both IP and DA protocol-based communications. Communication can occur at either the IP layer or the DA application layer. At the IP layer, the host application can interrogate the network nodes (and, by proxy, a DA device connected to a network node). To extend this service to DA device communications, DA device registration and resolve services are implemented on the DNS server. Similar to the manner in which an IP-based service uses a native, IP-based DNS resolve request, a SCADA system network can utilize a DA communications protocol, such as, MODBUS or DNP 3.0 resolution request against the SCADA-enabled DNS server for DA application-layer interrogation of endpoints (e.g., DA devices that conform to a DA communications protocol).

Figure 6:
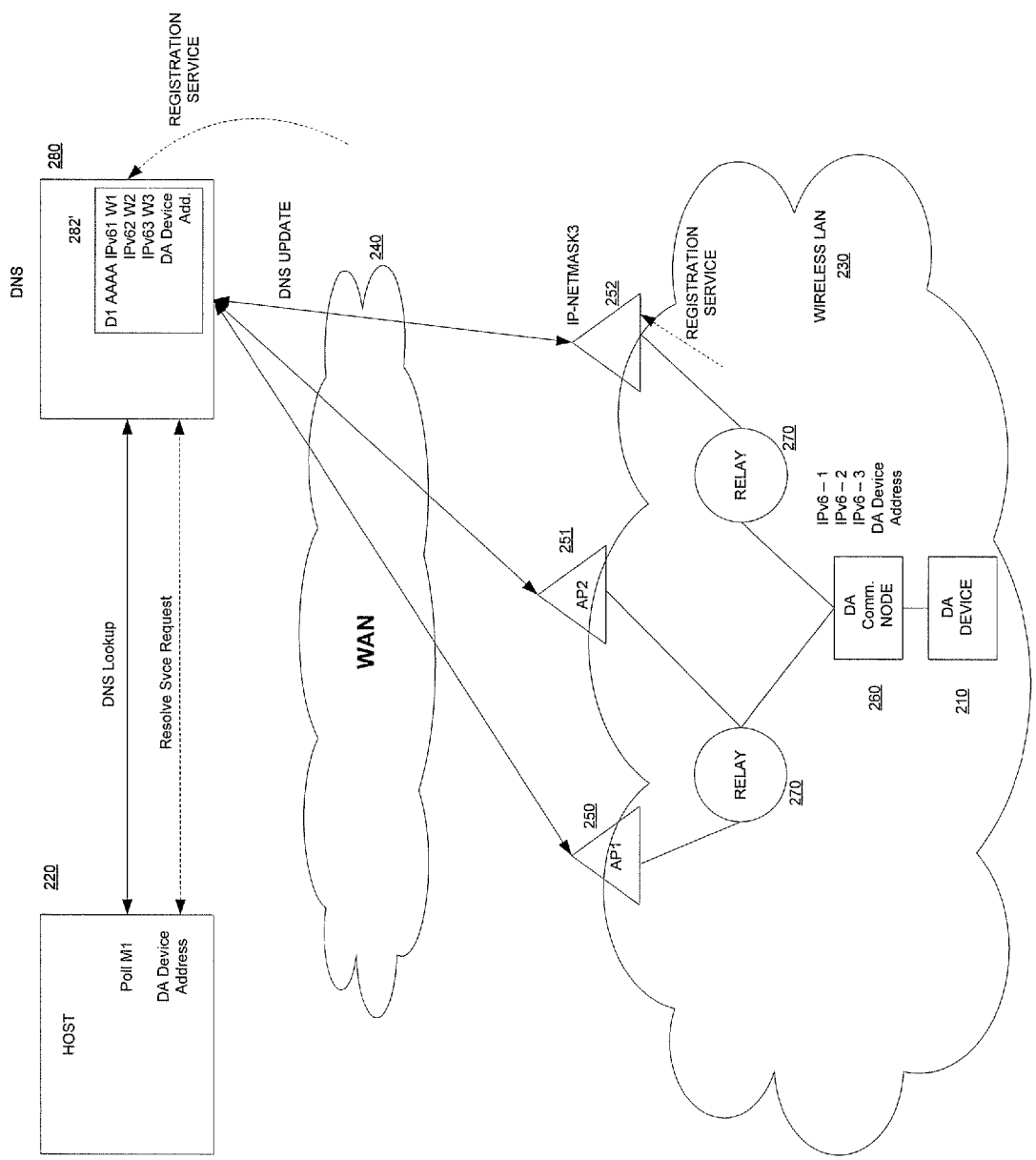
FIG. 6 is a block diagram of an IP network that contains a DA device.

An example of a network configured to operate in this manner is illustrated in FIG. 6. A specific DA device DNS resource record 282' is defined that includes not only the IP address or addresses for the DA communications node associated with a given DA device, but also the DA device address assigned to the device. As a result, when a request is made to the DNS server, the server can return an address binding that is natively dependent on the type of request (i.e., a DNS request returns bindings in IP DNS format; a DA protocol resolution request returns bindings in MODBUS or DNP 3.0 format). When presented with a fully qualified domain name, dynamic DNS provides the IP address currently associated with the named device, e.g. one of the three IPv6 addresses in the example of FIG. 6.

Furthermore, since the resource record contains both IP addresses and a DA device address, it can return both types of addresses in response to a single request. For example, in response to a DNS request, the server 280 can determine the DA device address for the identified device, even though it was not requested, and return it along with the appropriate IP address.

In its native mode, the DA device communicates with the SCADA system network at the application layer (L7) of the network. As a further feature of the invention, communications with the DA device can be carried out at the network layer, using IP-based protocols, while the device continues to operate in its native mode. In this aspect of the invention, when the host 220 sends a DA device resolve service request to the DNS server 280, the server does not return the DA device address for the device indicated in the request. Rather, because the DNS resource record for the device contains both IP addresses and a DA device address for the device, it is able to return an IP address. Using this IP address, the host is then able to send a command to the DA communications node 260 associated with the device.

Referring once again to FIG. 4, the IP-formatted data packet sent over the network is received by the communications node 160 at a network interface 164. In the case of a wireless network, for instance, the interface 164 can be a component of a wireless transceiver. The interface 164 passes the received data packet on to a processor 166, which reads the data and reformats the command according to a DA device protocol. The DA communications protocol-formatted command is then passed along to the intended device by means of the device interface 168, which in this example supports one or more DA protocols. In return, the communication node receives a response from the device, which conforms to the DA device protocol, at the interface 168. Rather than sending this response at the application layer in the conventional manner, the processor 166 reformats the data into an IP packet, which is then transmitted over the network via the interface 164. As a result, the operation of the network is transparent to the DA device. The only communications that employ the DA device protocol are those between the DA device and the communications node. All other communications over the network are based upon the IP protocol.

A particular advantage of this aspect of the invention is that multi-homing becomes possible for DA devices. Specifically, since IP-based protocols are employed to transmit the data from the DA device over the network, rather than DA device protocols, all of the features and functionality of an IP network can be utilized. As a result, the communications node 260 can select any one of the available access points 250, 251 or 252 as the return path to the host, rather than being limited to the single path designated by a fixed address associated with the DA device. A failure of the link to that fixed address will therefore not prevent the data from reaching the host, due to the path diversity provided by multi-homing. Consequently, the robustness of the overall SCADA system is increased.

For instance, in a network having DA device-compliant endpoint devices, the DA devices may communicate with the communications node via serial communications. In such a network, the communications node has an IP address that is used by the host to communicate with a DA device having a DA device address. As such, a host can poll a particular DA device through the communications node.

In another example, at least some of the DA devices may communicate via an Ethernet connection, and have their own IP address. In this case, the IP address of the DA device is registered with the DNS server 280, along with the IP address(es) of its associated communications node 260. Accordingly, the host may poll and communicate directly with the IP-based DA endpoint device via the WAN. In such a situation, the communications node 260 recognizes the IP address of its associated DA device, and acts like a relay to forward packets destined for that IP address.

A large utility may have several independent DNP 3.0 or MODBUS SCADA system networks running and may not necessarily be able to identify a device's location or what sphere of company control it is in by its protocol address. The DNS name that is stored in the DNS server can have a hierarchical structure. This structure can either be hierarchical in terms of the network that it is connected to, or it can be hierarchical in terms of what utility operator and substation the device is connected to.

It will be appreciated by those of ordinary skill in the art that the present invention can be embodied in other forms without departing from the spirit or essential characteristics thereof. The foregoing description is therefore considered to be illustrative, and not restrictive. The scope of the invention is indicated by the following claims, and all changes that come within the meaning and range of equivalents are therefore intended to be embraced therein.

What is claimed is:

1. A method of providing communication between nodes in a utility network, comprising:
   receiving a request to provide an application-layer address for a Distribution Automation (DA) device in the utility network at one of a domain name service (DNS) or a directory service, the DA device being configured to communicate according to a communication protocol including at least one of MODBUS and DNP 3.0;
   determining a network address for the DA device from a plurality of network addresses associated with the device stored at said service, said plurality of addresses including an application-layer address and at least one network-layer address; and
   returning at least one network-layer address associated with the DA device in response to said request.

2. The method of claim 1, wherein the network address is determined according to a network address preference metric that identifies one of a plurality of network addresses to be used in communicating with the DA device.

3. The method of claim 2, wherein the network address preference metric is at least partially based upon one of the network attributes selected from the group consisting of: routing preference, sub-network configuration, and service group.

4. The method of claim 1, wherein the network address and the at least one DA device address are included in a single message that is returned in response to the request.

5. The method of claim 1, wherein said service is implemented in a DNS server, and wherein the DNS server determines a DA device address associated with the DA device and returns said determined DA device address together with the network-layer address.

6. The method of claim 1, wherein said service is implemented in a directory server, and wherein the directory server determines a DA device address associated with the DA device and returns said determined DA device address together with the network-layer address.

7. The method of claim 1, wherein the network address is an Internet Protocol (IP)-formatted address.

8. A method of providing communication in a utility network between at least two nodes in the utility network, comprising:
   receiving, at a network address resolution service, a resource record request for a specified node in the utility network;
   in response to receiving the resource record request, selecting a network-layer address for the node in the utility network from an ordered list of one or more network-layer addresses associated with the node in the utility network;
   determining one or more Distribution Automation (DA) device addresses for the node in the utility network, the DA device address enabling the node to communicate according to a communication protocol including at least one of MODBUS and DNP 3.0; and
   returning the determined network-layer address and the determined one or more DA device addresses in response to the request.

9. The method of claim 8, wherein the ordered list is maintained in accordance with a network attribute metric, said network attribute metric specifying at least one measurable aspect of a network to determine a preferred ordering of network addresses for use in communicating with the node.

10. The method of claim 8, wherein the received resource record request includes a request to return a network-layer address associated with the node specified in the resource record request.

11. The method of claim 10, wherein the resource record request is included in a request to a domain name service (DNS) server.

12. The method of claim 10, wherein the resource record request is a directory service search.

13. The method of claim 9, wherein the resource record request is returned in a domain name service (DNS) response, and wherein the determination of the DA device addresses is performed even if the request does not specify returning DA device addresses.

14. The method of claim 9, wherein the resource record request is an LDAP search, and wherein the determination of the DA device addresses is performed even if the LDAP search does not specify returning one or more DA device addresses.

15. The method of claim 9, wherein the network-layer address is an Internet Protocol (IP)-formatted address.

16. A method of providing communication in a utility network between at least two nodes in the utility network, comprising:

receiving, at a network address resolution service, a resource record request for a specified node in the utility network;

determining a network-layer address for the specified node from among multiple network-layer addresses associated with a specified node, according to a network address metric;

determining one or more Distribution Automation (DA) device addresses for the specified node, the DA device address enabling the node to communicate according to a communication protocol including at least one of MODBUS and DNP 3.0; and sending the determined network address and determined DA device addresses in response to the request.

17. The method of claim 16, wherein the network address metric specifies a preferred path for communicating with the node associated with the determined network-layer address.

* * * * *